United States Patent
Miyake et al.

(10) Patent No.: US 12,275,053 B2
(45) Date of Patent: Apr. 15, 2025

(54) SHEARING DIE AND PRESS-FORMING METHOD

(71) Applicant: JFE STEEL CORPORATION, Tokyo (JP)

(72) Inventors: Hiroto Miyake, Tokyo (JP); Toyohisa Shinmiya, Tokyo (JP); Yuji Yamasaki, Tokyo (JP)

(73) Assignee: JFE STEEL CORPORATION, Tokyo (JP)

( * ) Notice: Subject to any disclaimer, the term of this patent is extended or adjusted under 35 U.S.C. 154(b) by 186 days.

(21) Appl. No.: 17/801,401

(22) PCT Filed: Dec. 22, 2020

(86) PCT No.: PCT/JP2020/047846
§ 371 (c)(1),
(2) Date: Aug. 22, 2022

(87) PCT Pub. No.: WO2021/171759
PCT Pub. Date: Sep. 2, 2021

(65) Prior Publication Data
US 2023/0082370 A1    Mar. 16, 2023

(30) Foreign Application Priority Data
Feb. 26, 2020   (JP) ................................ 2020-030319

(51) Int. Cl.
*B21D 28/26*   (2006.01)
*B21D 22/20*   (2006.01)
(Continued)

(52) U.S. Cl.
CPC ................................... *B21D 28/26* (2013.01)

(58) Field of Classification Search
CPC ...... B21D 28/26; B21D 28/14; B21D 22/206; B21D 24/16; B21D 28/02; B21D 37/08; B21D 43/28; B23D 31/001
See application file for complete search history.

(56) References Cited

U.S. PATENT DOCUMENTS

| 3,785,236 A | 1/1974 | Peterson |
| 2014/0023740 A1 | 1/2014 | Kashi et al. |
| 2019/0366412 A1* | 12/2019 | Nijuri .................... B21D 28/26 |

FOREIGN PATENT DOCUMENTS

| CN | 203991986 U | 12/2014 |
| CN | 208728494 U | 4/2019 |

(Continued)

OTHER PUBLICATIONS

English translate (JP2000126900A), retrieved date Jun. 5, 2024.*
(Continued)

*Primary Examiner* — Mohammed S. Alawadi
(74) *Attorney, Agent, or Firm* — Oliff PLC

(57) ABSTRACT

A shearing die for preventing damage of a die tool in shearing of a super-high-tension steel sheet and a press-forming method using the same. The shearing die for shearing a metal sheet in a direction intersecting a first-sheared edge of the metal sheet in press-working including a plurality of shearing processes to produce a formed article from the metal sheet by press-forming, in which the shearing die comprises a fitting part that can detach a shearing blade in the vicinity of a region coming in contact with an end of the first-sheared edge.

11 Claims, 8 Drawing Sheets

(51) Int. Cl.
  *B21D 22/26* (2006.01)
  *B21D 24/16* (2006.01)
  *B21D 28/02* (2006.01)
  *B21D 28/10* (2006.01)
  *B21D 28/14* (2006.01)
  *B21D 31/00* (2006.01)
  *B21D 37/01* (2006.01)
  *B21D 37/02* (2006.01)
  *B21D 37/08* (2006.01)
  *B21D 43/28* (2006.01)
  *B23D 35/00* (2006.01)

(56) References Cited

FOREIGN PATENT DOCUMENTS

| JP | S58-9227 U | | 1/1983 |
|----|------------|---|--------|
| JP | H01-164745 A | | 6/1989 |
| JP | H05-7944 A | | 1/1993 |
| JP | H11-254054 A | | 9/1999 |
| JP | 2000126900 A | * | 5/2000 |
| JP | 2001015665 A | * | 1/2001 |
| JP | 2006-169624 A | | 6/2006 |
| JP | 2011-189419 A | | 9/2011 |
| JP | 2012-96241 A | | 5/2012 |
| JP | 2012-170994 A | | 9/2012 |
| JP | 2012-232344 A | | 11/2012 |
| KR | 10-2011-0093012 A | | 8/2011 |

OTHER PUBLICATIONS

English translate (JP2001015665A), retrieved date Jun. 5, 2024.*
Jul. 27, 2023 Extended European Search Report Issued in European Patent Application No. 20921910.4.
Nov. 1, 2022 Office Action issued in Japanese Patent Application No. 2021-555514.
Mar. 9, 2021 International Search Report issued in International Patent Application No. PCT/JP2020/047846.
Jul. 19, 2022 Office Action issued in Japanese Patent Application No. 2021-555514.
Gang et al., "Mechanical Foundation", Kaiming Publishing House, pp. 56-57, Feb. 28, 2010.
Yan et al., "China Mechanical Design Canon", Jiangxi Science and Technology Publishing House, pp. 714-715, Jan. 31, 2002.
Aug. 8, 2024 Office Action issued in Chinese Patent Application No. 202080097105.7 (with concise explanation of relevance).
Jun. 25, 2024 Office Action issued in Korean Patent Application No. 10-2022-7028535.
Jan. 2, 2025 Office Action issued in Chinese Patent Application No. 202080097105.7 (with partial translation as concise explanation of relevance).
Li. "Stamping Process and Die Design", Beijing Institute of Technology Press, 1st Edition, pp. 72-74 (Mar. 31, 2018) (with partial translation as concise explanation of relevance).

* cited by examiner

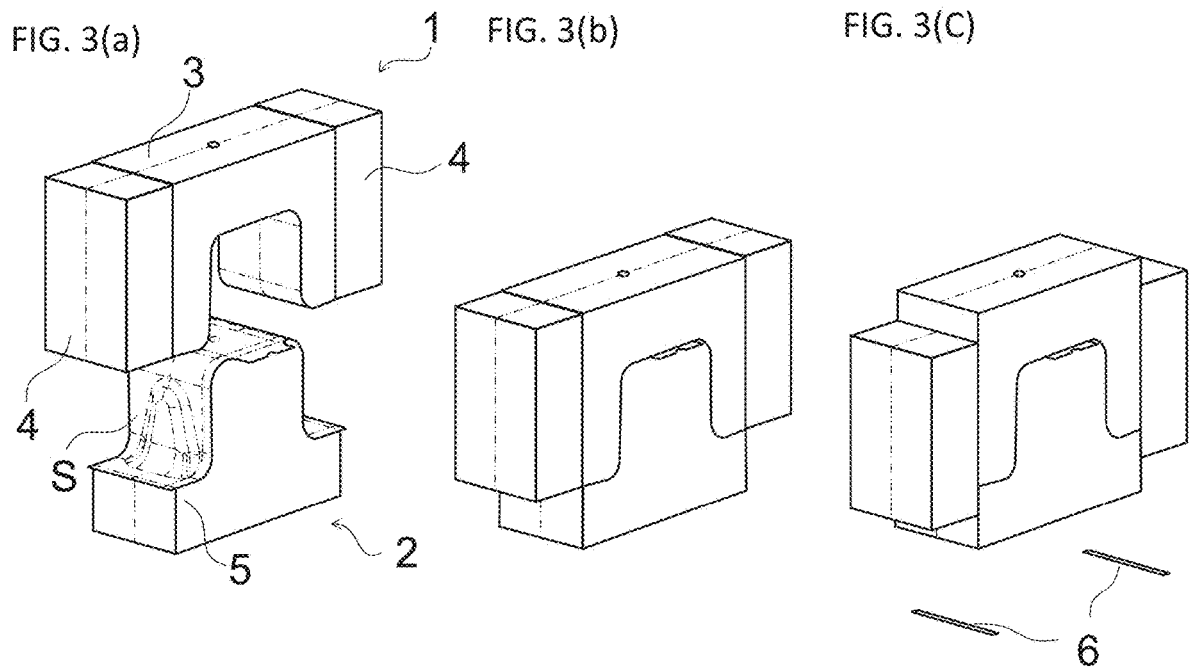
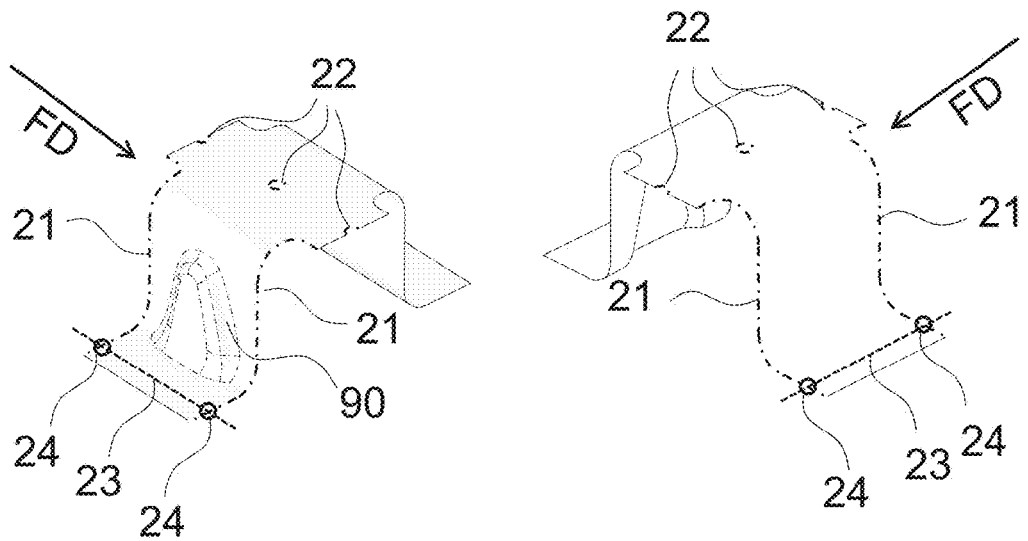

FIG. 10(a)
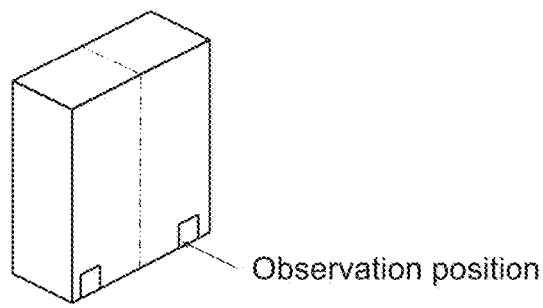
Observation position
FIG. 10 (b1)
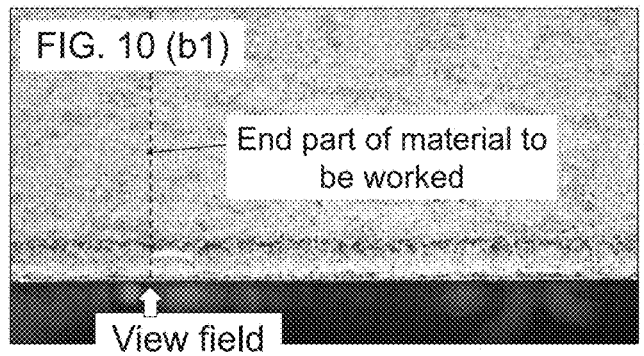
End part of material to be worked
View field
FIG. 10(b2)
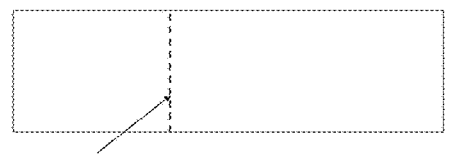
End part of material to be worked
FIG. 10(c1)
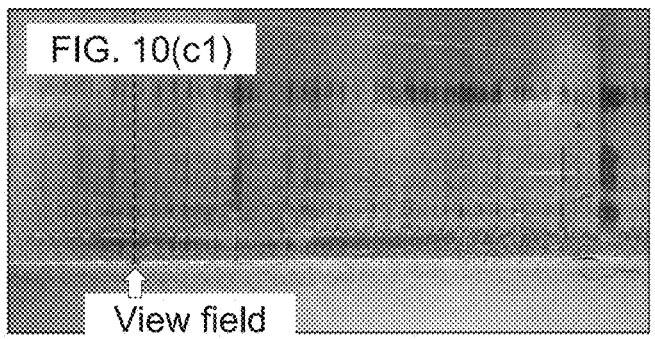
View field
FIG. 10(c2)
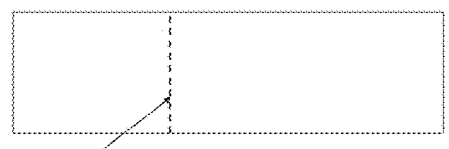
End part of material to be worked
FIG. 10(d1)
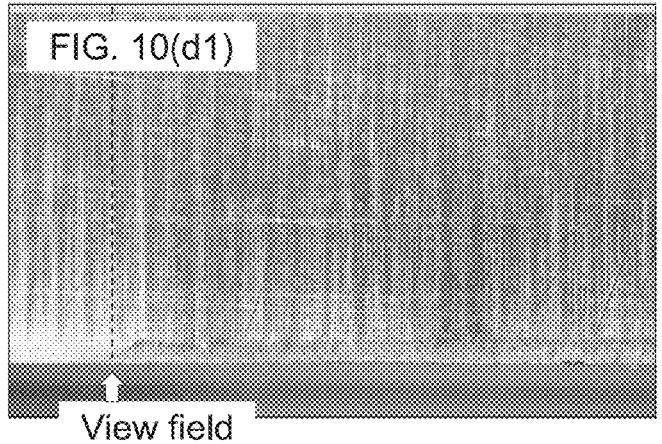
View field
FIG. 10(d2)
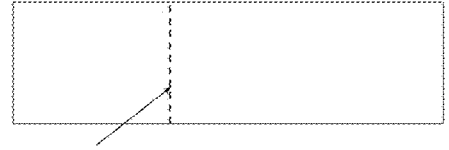
End part of material to be worked FIG. 11(a)
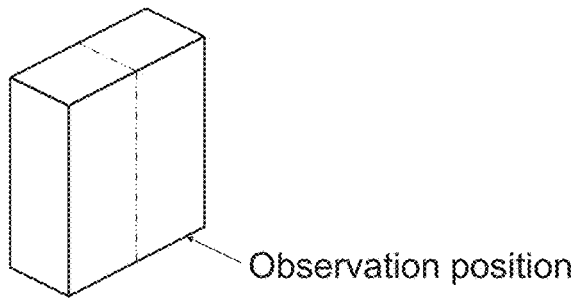
Observation position
FIG. 11(b1)
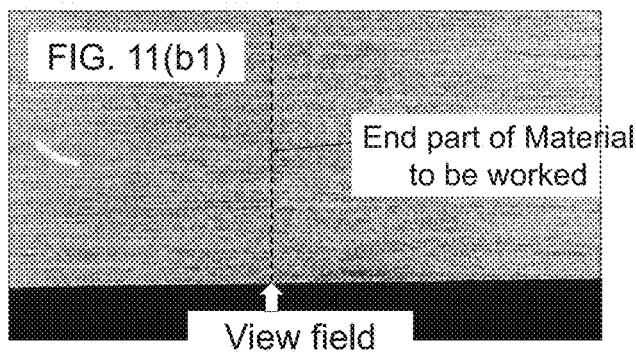
End part of Material to be worked
View field
FIG. 11(b2)
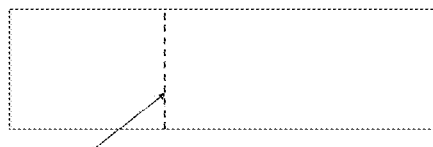
End part of material to be worked
FIG. 11(c1)
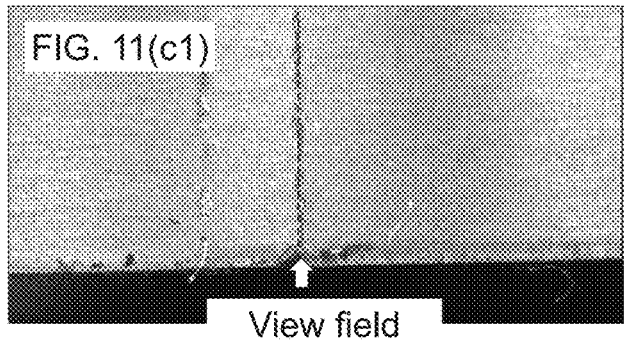
View field
FIG. 11(c2) Chipping
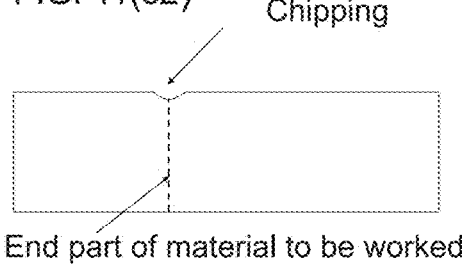
End part of material to be worked
FIG. 11(d1)
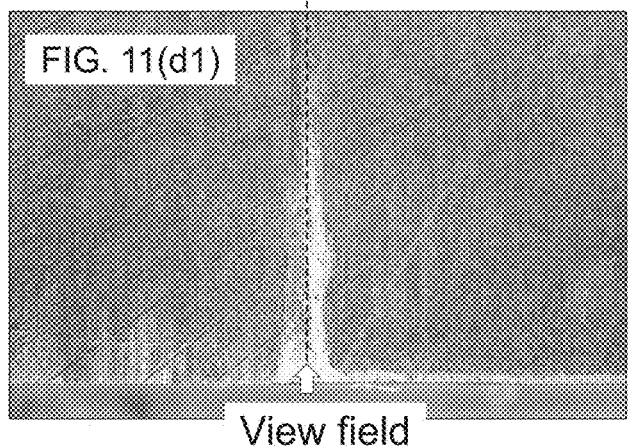
View field
FIG. 11(d2) Proceeded galling in chipping portion
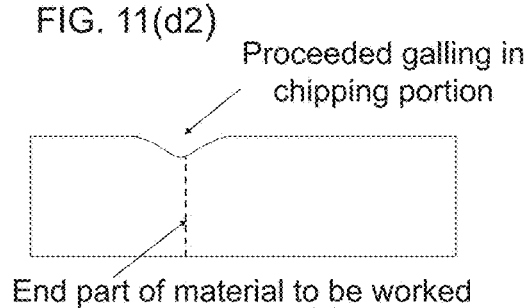
End part of material to be worked

SHEARING DIE AND PRESS-FORMING METHOD

TECHNICAL FIELD

This invention relates to a shearing die having an excellent die galling resistance and a press-forming method that includes a shearing process using the shearing die.

BACKGROUND ARTS

Processing of metal sheets, including automobile parts, mainly uses press-forming with a press device and press die. The press-forming used when such a metal sheet as raw material is formed into a desired product shape comprises blanking in which a coil material is sheared to form a blank; forming such as bending; drawing or the like; trimming in which unnecessary material is cut off from a final product; and so on.

It has been recently demanded to decrease $CO_2$ emissions of the frame components of automobile bodies by improving collision safety and weight saving, and to attain such a demand, high-tension steel sheets having a high strength have been applied.

Especially, in press-forming of a super-high-tension steel sheet having a tensile strength of more than 980 MPa, the die may be damaged to cause the deterioration of the surface quality of a product. In shearing of cutting the metal sheet to be a raw material, also, a shearing blade that comes in actual contact with the material possibly suffers chipping or wearing, causing deterioration of the quality of the sheared end face, which may largely affect formability at a subsequent process and resistance to hydrogen embrittlement of a product to be formed.

Therefore, the press-working of such a super-high-tension steel sheet has a problem that die tools need to be replaced and maintained more frequently than those for a conventional steel sheet having a relatively low strength to secure the quality of a formed article.

Against such a problem, to prevent baking in press-forming, for example, Patent Literature 1 proposes a coated tool having an excellent wear resistance, which is obtained by forming a protection coating by a PVD method on the forming surface that comes in contact with a body to be formed.

Patent Literatures 2 and 3 each propose tool steel having an excellent die galling resistance by optimizing the ingredients of the tool steel.

As described above, in order to prevent die damages of the shearing blade in shearing of the super-high-tension steel sheet, it is appropriate to adopt tool steel hardly causing chipping or wearing and also conduct a coating treatment including the PVD method for mitigation of a sliding resistance against a material to be worked in the shearing.

CITATION LIST

Patent Literature

Patent Literature 1: JP-A-2012-232344
Patent Literature 2: JP-A-2011-189419
Patent Literature 3: JP-A-2006-169624

SUMMARY OF INVENTION

Technical Problem

In the measures disclosed in Patent Literatures 1 to 3, however, it is necessary to apply tool steel having an excellent wear resistance to all tool steels constituting the shearing blade that come in actual contact with the material to be worked and further apply PVD coating treatment thereto. In this case, the measures are taken even for areas where die damage would not normally be a problem, which leads to a new issue of increase in time and costs required for replacement and maintenance of die tools.

The invention is made in consideration of the above circumstances, and an object thereof is to provide a shearing die that can reduce the time and costs required for the replacement and maintenance of die tools in shearing of press-forming and prevent damage of the die tools in shearing of a super-high-tension steel sheet, and propose a press-forming method including shearing that uses the shearing die.

Solution to Problem

The shearing die according to the invention that advantageously solves the problem is a shearing die for shearing a metal sheet in a direction intersecting the first-sheared edge of the metal sheet in press-working that includes a plurality of shearing processes to produce a formed article from the metal sheet by press-forming, in which the shearing die comprises a fitting part that can detach a shearing blade in the vicinity of a region in contact with an end of the first-sheared edge.

The press-forming method according to the invention is a method for press-forming a metal sheet comprising a plurality of shearing processes, and comprises the first shearing for shearing a formed article so as to leave an excess portion in a part of the outline of the formed article and the second shearing for shearing the excess portion in a direction intersecting the sheared edge formed in the first shearing to form into the formed article, wherein the excess portion is sheared using the shearing die in the second shearing so as for the fitting part to come in contact with the end part of the sheared edge formed in the first shearing.

Advantageous Effects of Invention

The shearing die according to the invention can provide a shearing die that reduces the time and costs required for the replacement and maintenance of a die tool in shearing of press-forming and that also prevents damage to the die tool in shearing of a super-high-tension steel sheet.

The press-forming method according to the invention uses the shearing die in the second shearing, reducing the time and costs required for replacement and maintenance of a die tool in the shearing and preventing damage to the die tool in the shearing of the super-high-tension steel sheet, whereby the press-forming method has a high operating rate with decreased costs.

It is preferable that the shearing die according to the invention has a fitting part that satisfies at least one condition selected from (a) the fitting part is made of die steel having hardness higher than that of the shearing blade excluding the fitting part; (b) the fitting part is subjected to a surface nitriding treatment; and (c) the fitting part is subjected to a coating treatment. This will result in extended service life of the fitting part of the shearing blade.

The fitting part of the shearing die according to the invention is preferable to have a length of not less than 1 mm on both sides with the center at the position where the shearing blade comes in contact with the end of the first sheared edge. This can obtain the effect of the fitting part effectively.

In the press-forming method according to the invention, it is preferable that the tensile strength of the metal sheet exceed 980 MPa. This allows the shearing of a super-high-tension steel sheet to have a high accuracy over a long period.

BRIEF DESCRIPTION OF DRAWINGS

FIG. 1 is a schematic view showing a form of a hat-shaped press-formed article applied to an embodiment of the invention, where

FIG. 3 is a perspective view of a shearing die used in the second shearing (flange trimming), where FIG. 3(a) shows an arrangement of the die before the shearing, FIG. 3(b) shows an arrangement of the die during shearing, and FIG. 3(c) shows an arrangement of the die after the shearing.

FIG. 4 is a schematic view showing a part to be subjected to shearing in a press-formed article applied to the above embodiment, where FIG. 4(a) is a perspective view viewing from a side having a necking shape, and FIG. 4(b) is a perspective view viewing from a side having no necking shape.

FIG. 5 is a schematic view showing a method of measuring the hardness of a steel sheet subjected to shearing, where

FIG. 6 is a graph showing measurement results of hardness in the vicinity of a sheared face, where

FIG. 10(a) is a perspective view schematically showing an observation position of an upper blade in a shearing die according to an invention example, and FIGS. 10(b1) to 10(d1) are enlarged views of observation photographs of a fitting part before shearing, after shearing 5000 times and after shearing 10000 times, respectively, and FIGS. 10(b2) to 10(d2) are schematic views of wearing degree as viewed from a direction shown in the photographs.

FIG. 11(a) is a perspective view schematically showing an observation position of an upper blade in a shearing die according to the conventional example, and FIGS. 11(b1) to 11(d1) are enlarged photographs of observing a fitting part before shearing, after shearing of 5000 times and after shearing of 10000 times, respectively, and FIGS. 11(b2) to 11(d2) are schematic views of wearing degree viewing from a direction shown in the photographs, respectively.

DESCRIPTION OF EMBODIMENTS

The inventors have observed the damaged state of the shearing blade coming in contact with the neighboring part of the end of the sheared edge that had been once subjected to shearing when a region including the sheared edge that had been once subjected to shearing was further subjected to shearing in the shearing of the press-working. As a result, the inventors have the knowledge that especially the shearing blade coming in contact with the neighboring part of the end of the sheared edge was largely damaged.

The invention is developed based on the above knowledge.

An embodiment of the invention will be described with reference to the drawings below.
<Forming>

Figure 1A:
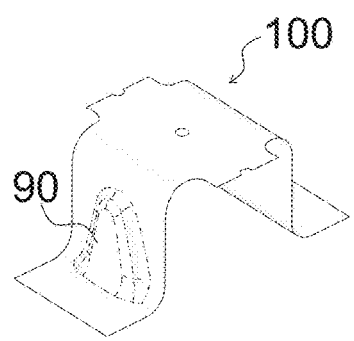
FIG. 1(a) is a perspective view viewing from a side having a necking shape.
Figure 1B:
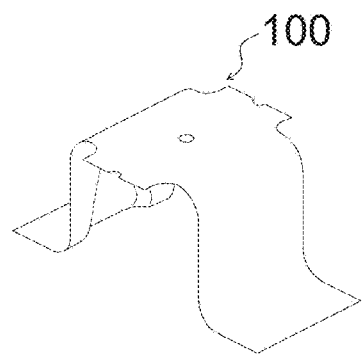
FIG. 1(b) is a perspective view viewing from a side having no necking shape.
Figure 1C:
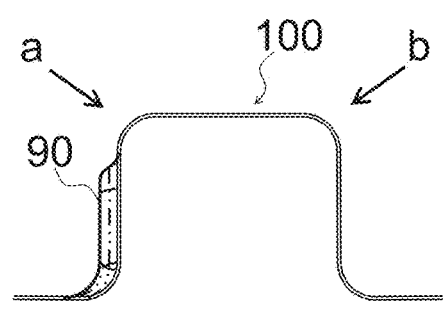
FIG. 1(c) is a side view.
Figure 2:
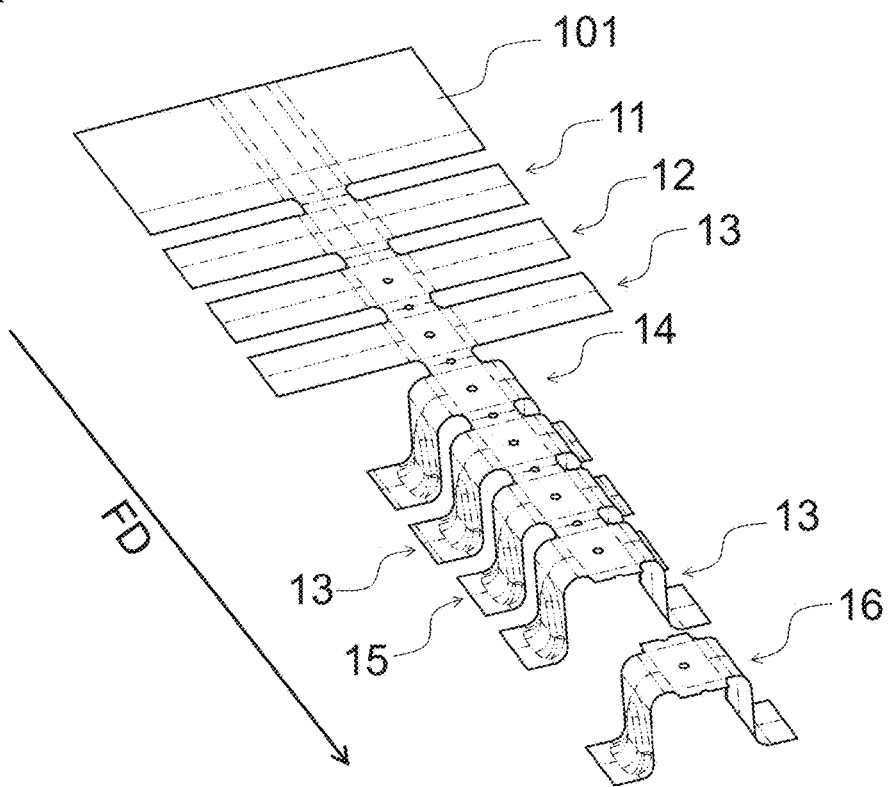
FIG. 2 is a schematically perspective view showing a press-forming of the above embodiment.

As an embodiment of the invention, an explanation will be made on a press-forming case where a hat-shaped part shown in FIG. 1 is continuously worked in a process shown in FIG. 2. FIG. 1(a) is a perspective view of a hat-shaped press-formed article 100 as viewed from a side having a necking shape 90; FIG. 1(b) is a perspective view of the hat-shaped press-formed article 100 as viewed from another side having no necking shape; and FIG. 1(c) is a side view of the hat-shaped press-formed article 100. FIG. 2 is a perspective view schematically showing the press-forming for the hat-shaped press-formed article.

In the embodiment of FIG. 2, a coil of a metal sheet as a raw material is subjected to slitting to form a hoop material 101 having a width of 200 mm and set into an uncoiler. After being discharged from the uncoiler, the hoop material 101 is subjected to correction for winding habits by using a leveler and fed by 70 mm by a feeder each time one press-forming is completed and further subjected to press-forming.

In the press-forming of this embodiment, the first process is the first shearing (blanking) 11 to form slits on both ends of the hoop material 101. The second process is piercing 12 to punch out a circular hole in the widthwise center of the hoop material 101. The third process performs forming 14 to form a hat-shaped cross-section by subjecting the flat-state hoop material to bending. The fourth process is the second shearing (flange trimming) 15 to trim both ends of the flange that will not be a product (excess portion) of the formed part with the hat-shaped cross-section. In the final fifth process, shearing (flat trimming) 16 is conducted to trim the top board face so that the connected part with the hat-shaped cross-section is separated from another. No processing can be performed in an idle process 13 shown in FIG. 2 where no die can be arranged continuously due to the die arrangement, such as between the second process and the third process, between the third process and the fourth process, and between the fourth process and the fifth process. Note that the arrow FD shows the feeding direction of the material.
<Shearing Die>

FIG. 3 shows a shearing die used in the flange trimming 15 in the fourth process as the second shearing where the sheared edge that once has been subjected to shearing in the first shearing (blanking) 11 is again subjected to shearing in the forming process shown in FIG. 2. FIG. 3(a) shows the die arrangement before shearing; FIG. 3(b) shows the arrangement during shearing; and FIG. 3(c) shows the die arrangement after shearing. The shearing die used in the flange trimming 15 is configured with an upper die 1 comprising a pad 3 and a shearing blade (upper blade) 4 and a lower die 2 holding a material to be worked S from the bottom and comprising a shearing blade (lower blade) 5, as shown in FIG. 3. In shearing, the pad 3 and the shearing blade 4 descend with the material to be worked S being placed on the lower mold 2 (FIG. 3(*a*)), so that the pad 3 pushes to hold the material to be worked S (FIG. 3(*b*)). The shearing blade 4 further descends to cut only a portion protruding from the pad 3 (excess portion to be scrap) 6 (FIG. 3(*c*)).

<Shearing Position of Material to be Worked>

FIG. 4 shows a position to be subjected to shearing in the formed article in each shearing of the press-forming shown in FIG. 2. FIG. 4(*a*) shows a perspective view as viewed from a side having a necking shape 90, and FIG. 4(*b*) shows a perspective view as viewed from a side having no necking shape. As shown in FIG. 4, shearing in the flange trimming 15 of the fourth process is performed in the direction 23 intersecting and including the sheared edge 21 that has been subjected to shearing in blanking 11 of the first process. The shearing blade 4 often suffers damages at the position (position of symbol ○), shown in FIG. 4, of coming in contact with a neighboring area 24 of the end of the first sheared edge 21 while performing shearing.

<Sheared Edge Once Subjected to Shearing>

Figure 5A:
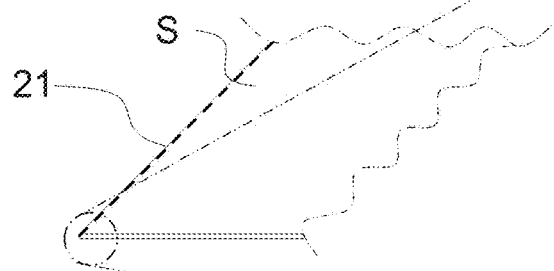
FIG. 5(a) is a partial perspective view showing a sheared face.
Figure 5B:
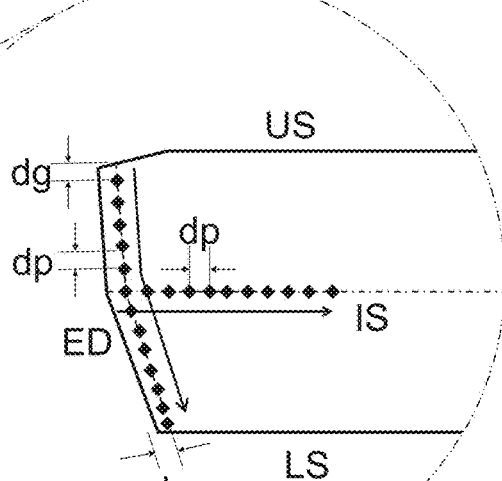
FIG. 5(b) is an enlarged view of a position of measuring the hardness.
Figure 6A:
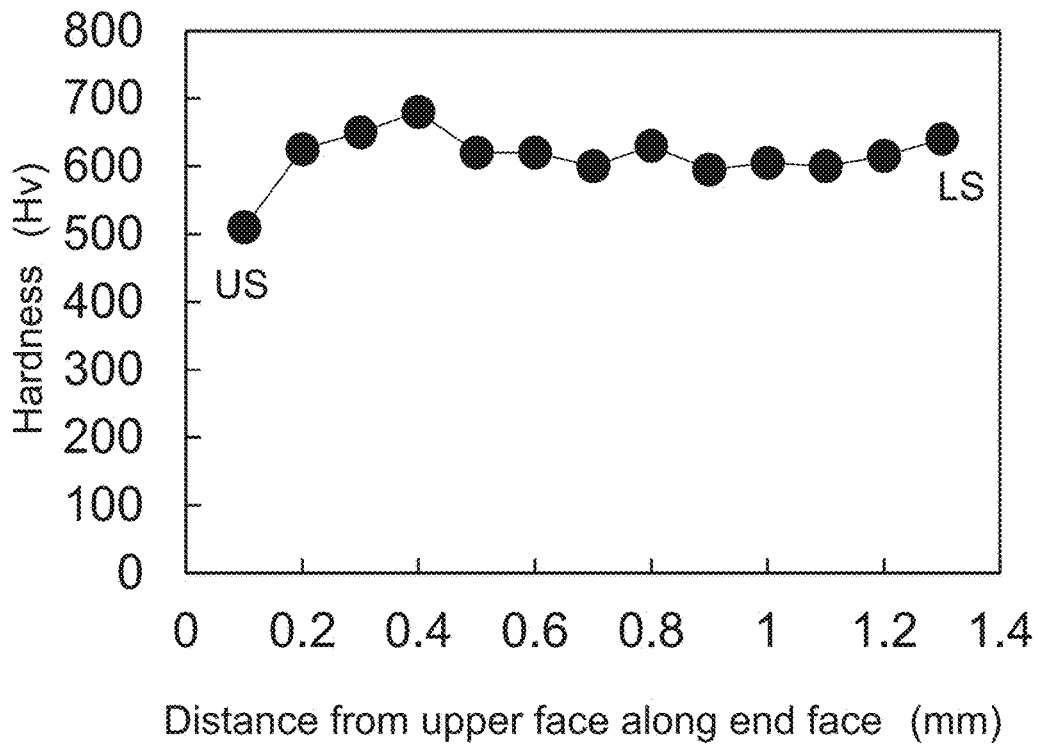
FIG. 6(a) is a graph showing a distribution of hardness in a direction parallel to a sheared edge.
Figure 6B:
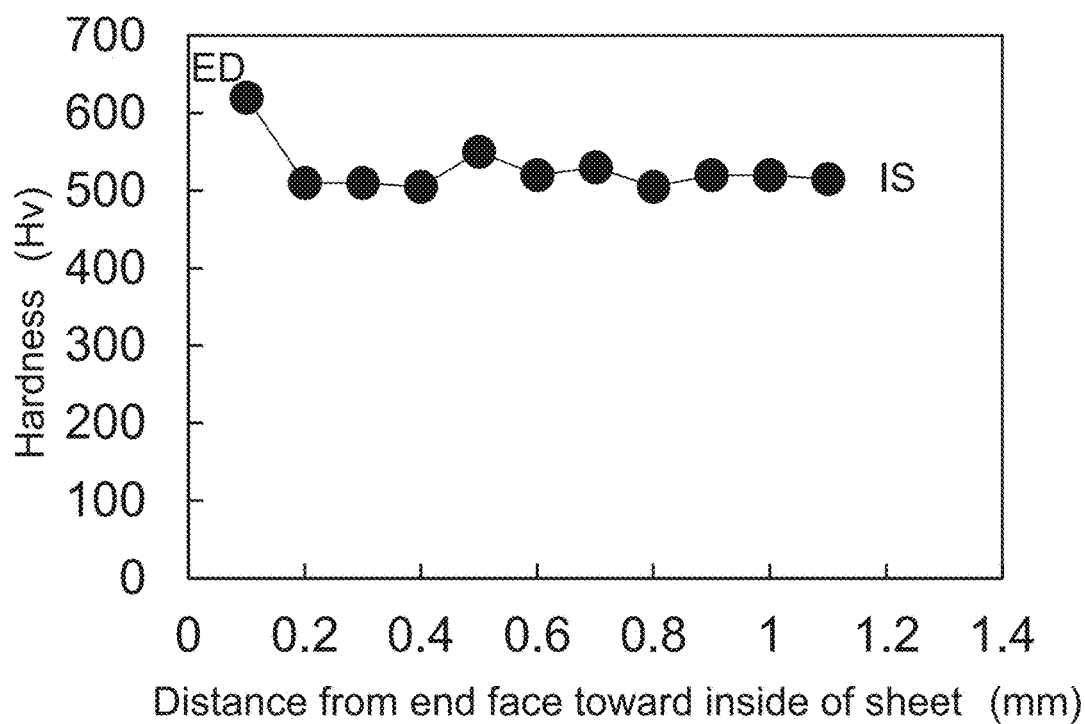
FIG. 6(b) is a graph showing a distribution of hardness in a direction from a sheared edge in the central part of the sheet thickness toward the inside of the sheet.

A cold-rolled steel sheet S (sheet thickness: 1.2 mm) having a tensile strength of 1470 MPa grade is subjected to shearing, and the hardness in the vicinity of the sheared edge 21 is measured by using a microhardness tester at a pushing load of an indenter of 100 gf (0.98 N). The hardness is measured in the vicinity of the sheared edge 21 having been subjected to shearing shown in FIG. 5, with a shearing clearance of 12% of the sheet thickness and a pitch dp from a sagging side (upper face) US to a burring side (lower face) LS of 0.1 mm. In the measurement, the distance de from the end face ED of the sheared edge is 0.1 mm, and the distance dg from the surfaces of the sagging side US and the burring side LS is 0.1 mm. Hardness is also measured in the central part of the sheet thickness at a pitch dp of 0.1 mm from the end face ED of the sheared edge toward the inside of the sheet IS. FIG. 6 shows a relation between measurement results and the measurement positions.

The results of the hardness measurement show, as shown in FIGS. 6(*a*) and 6(B), the hardness is about 600 to 700 Hv as Vickers hardness in the vicinity of the end face ED of the sheared edge. However, the hardness decreases from the end face ED of the sheared edge toward the inside of the sheet, and the hardness inside the sheet IS, or the hardness of the base metal itself is about 500 Hv. That shows that the material in the vicinity of the end face ED of the sheared edge is work-hardened by the shearing, resulting in being locally high in strength.

<Shearing Blade>

Figure 7A:
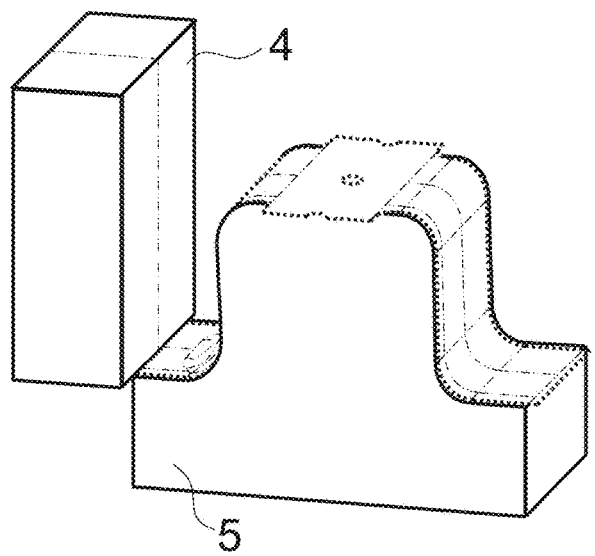
FIG. 7(a) is a perspective view schematically showing a shearing method with a conventional shearing die.
Figure 7B:
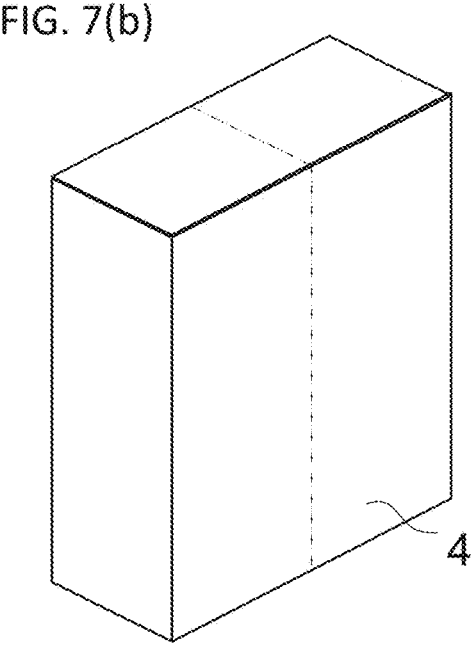
FIG. 7(b) is a perspective view showing an upper blade of the conventional shearing die.
Figure 8A:
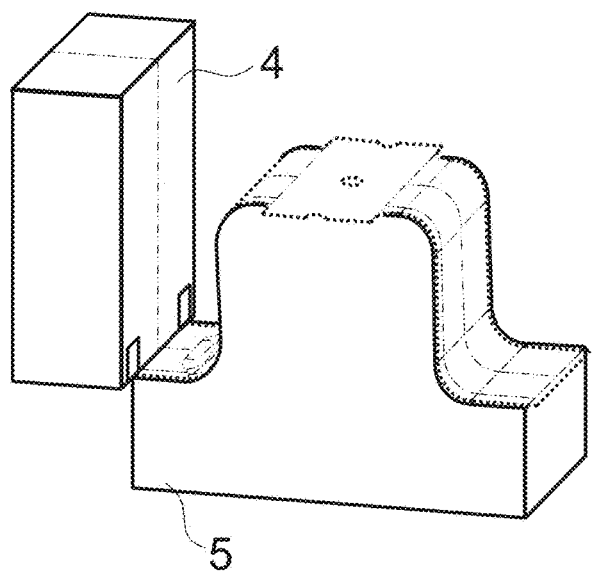
FIG. 8(a) is a perspective view schematically showing a shearing method according to an embodiment of the invention and FIG. 8(b) is an enlarged perspective view showing an upper blade of a shearing die according to an embodiment of the invention.
Figure 8B:
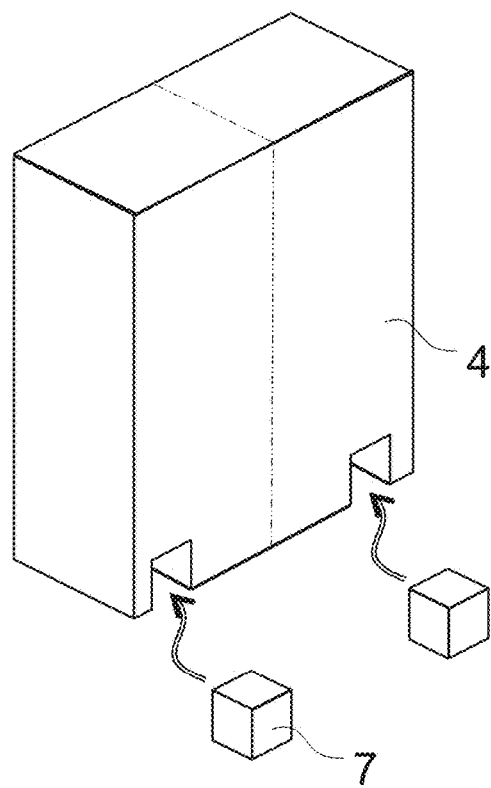

FIG. 7 shows a conventional regular shearing blade. FIG. 7(*a*) is a perspective view schematically showing a shearing method using the conventional shearing die, and FIG. 7(*b*) is an enlarged perspective view of an upper blade 4 of the conventional shearing die. The shearing blade 4 is made of steel for cold die SKD11 or the like in many cases. FIG. 8 shows a shearing blade according to one embodiment of the invention. FIG. 8(*a*) is a perspective view schematically showing the shearing method according to this embodiment, and FIG. 8(*b*) is an enlarged perspective view of an upper blade 4 of the shearing die according to this embodiment. The inventors have knowledge that, when a region including the sheared edge 21 that has been once subjected and work-hardened is subjected to shearing again, damages are often caused on the shearing blade 4 in the region coming in contact with the neighboring region of the work-hardened sheared edge 21. Based on the above knowledge, therefore, the part of the shearing blade corresponding to the region 24 indicated by ○ in FIG. 4 adopts a replaceable insert structure as a fitting part 7. The main body of the shearing blade 4 is made of steel for cold die SKD11 or the like while the fitting part 7 is made of tool steel such as powdery high-speed steel SKH40 or SKH51 so as to have hardness higher than that of at least the main body and wear resistance and sliding properties. Nitriding treatment may be performed to increase the hardness of the surface of the fitting part 7, or coating treatment such as PVD or the like may be performed to secure high sliding properties depending on the case.

In this embodiment, only the neighboring area of the shearing blade 4 coming in contact with the sheared edge 21 that has been subjected to shearing once and work-hardened often causes damage and is thus made into an insert structure as the fitting part 7. Since only the fitting part 7 has a replaceable structure, the shearing blade 4 of this embodiment has a long service life by mass-production press-forming and is easily replaced. The nitriding treatment or coating treatment, when applied, needs to be performed only on the fitting part, so that the cost required for the maintenance can be largely decreased. Also, the shearing die of this embodiment is preferable to be used in the press-forming method for high-tension steel sheets of not less than 980 MPa class where the shearing die is easily caused, and particularly for super-high-tension steel sheets of not less than 1500 MPa class.

EXAMPLE

Figure 9:
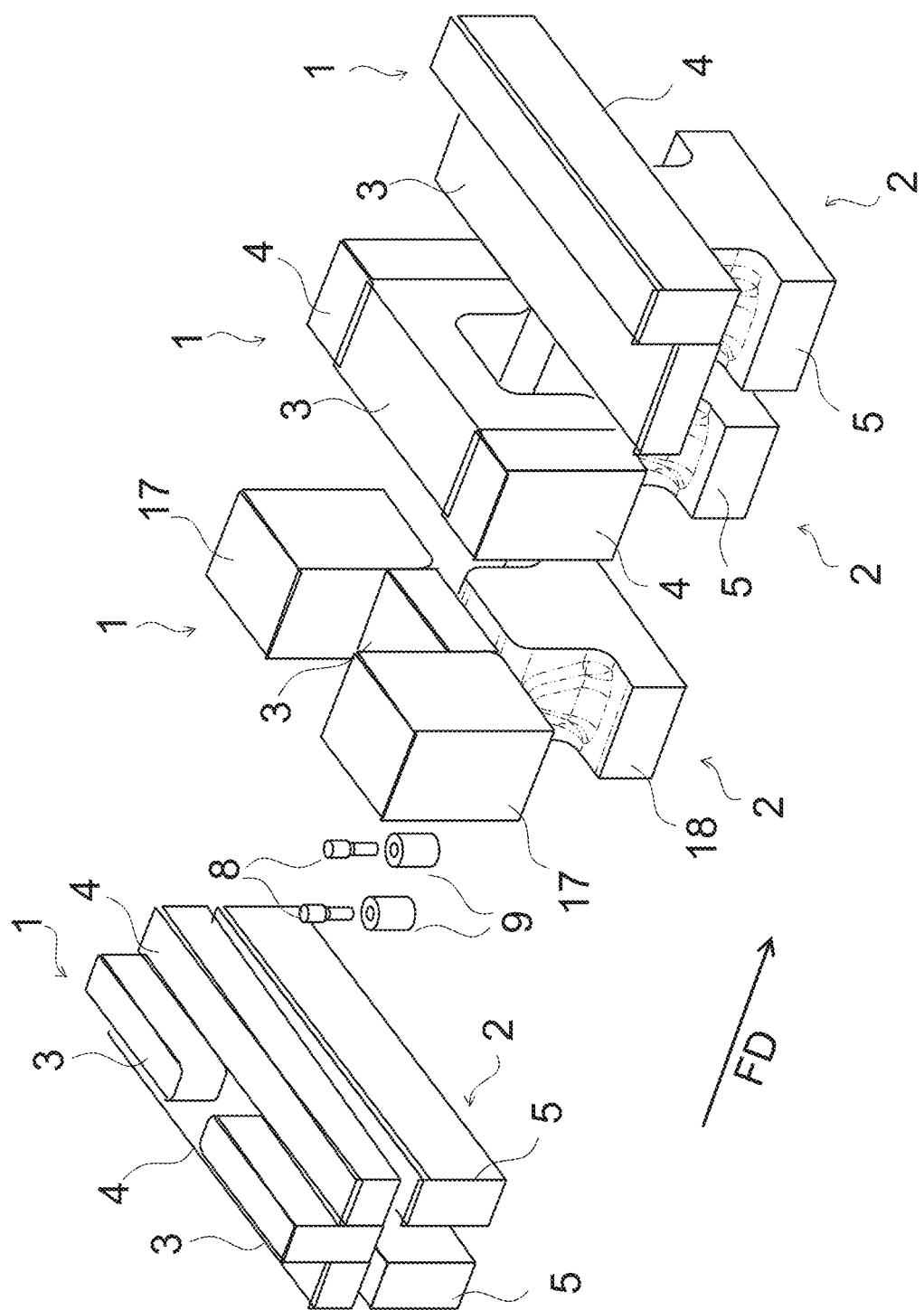
FIG. 9 is a perspective view schematically showing the configuration arrangement of the die for press-forming used in the example.

A press-forming die having a configuration shown in FIG. 9 is formed to evaluate the damage of a shearing blade. A cold-rolled steel sheet as a target material having a tensile strength of 1470 MPa class (sheet thickness: 1.4 mm) is press-formed into a part having a hat-shaped cross-section shown in FIG. 1. As shown in FIG. 2, by using the formed die, a hoop material subjected to slit processing to have a width of 200 mm is subjected to blanking 11 at the first process, piercing 12 at the second process, bending (shaping 14) at the third process, flange trimming 15 at the fourth process, and flat trimming 16 at the fifth process. After the first press-forming, the hoop material 101 is moved forward by 70 mm and then subjected to 10000 continuous press-forming at a rate of 30 times/minute. The shearing clearance is set to 12.5% of the sheet thickness in each process of blanking 11, piercing 12, flange trimming 15, and flat trimming 16.

The shearing blade in the formed die coming in actual contact with the material is made of regular steel for cold die SKD11, which has a hardness of 58 HRC. The main body of the shearing blade used in flange trimming 15 is made of steel for cold die SKD11. The fitting part 7 has a width of 20 mm centering on the region having in contact with the end part of the sheared edge that has been sheared and work-hardened in blanking 11 of the first process. The fitting part 7 is formed by using a powdery high-speed steel SKH51 as material, which had a hardness of 64 HRC. Further, the surface of the fitting part 7 on the sides coming in contact with the material S to be worked is subjected to a TiC-based PVD coating treatment. For comparison, continuous press-working is performed under the same conditions as above using shearing blades for the flange trimming process all made of SKD11.

FIGS. 10 and 11 show photographs of shearing blades of this embodiment and the conventional member in flange trimming 15, respectively, when continuous press-forming is conducted 10000 times under the above press-forming condition. As shown in FIG. 11, chipping is caused on the conventional shearing blade using SKD11, which has relatively low hardness, at a position (shown by a broken line) corresponding to the end part of the material to be worked (FIG. 11(*c*2)), when press-forming is performed 5000 times. When the press-forming is further conducted to 10000 times, it is recognized that wearing proceeds from the chipped part and the die is largely damaged and dented in the vicinity of the end part of the material to be worked (FIG. 11(*d*2)). On the other hand, when using a shearing blade in which only the fitting part in the vicinity of the material to be worked is an insert formed by using the powdery high-speed steel SKH51 and applying TiC-based PVD coating treatment and the other parts is made from SKD11, no damage is found in the end part of the material to be worked even after the press-forming of 10000 times (FIG. 10(*c*2), (*d*2)).

The above results indicate that, when the sheared end face that has been once sheared and work-hardened is again subjected to the shearing, by applying such a configuration of the shearing blade in which the part in the vicinity of the first sheared end face can be replaced and is made harder steel material the other parts and performing PVD coating treatment thereon, the damage of the die can be suppressed in the shearing.

INDUSTRIAL APPLICABILITY

The invention is not limited to the above embodiment and is preferably applied to a shearing die used in a processing method comprising a plurality of shearing processes, in which the shearing die is used in the second shearing for shearing in the direction intersecting a sheared edge formed in the first shearing.

REFERENCE SIGNS LIST

90 necking
100 press-formed article
101 hoop material
1 upper die
2 lower die
3 pad, blank holder
4 shearing blade (upper blade)
5 shearing blade (lower blade)
6 scrap
7 fitting part
8 pierce punch
9 button die
11 blanking
12 piercing
13 idling
14 forming
15 flange trimming
16 flat trimming
17 bending blade
18 punching
21 sheared edge by blanking
22 sheared edge by piercing
23 shearing direction by flange trimming
24 region where shearing blade comes in contact with sheared edge
S material to be worked
FD feeding direction

The invention claimed is:

1. A shearing die for shearing a metal sheet in a direction intersecting a first-sheared edge of the metal sheet in a press-working including a plurality of shearing processes to produce a formed article from the metal sheet by a press-forming, characterized in that
the shearing die comprises a shearing blade and a fitting part configured to detach from the shearing blade, the fitting part being provided in a vicinity of a region of the shearing blade arranged to come in contact with an end of the first-sheared edge, the metal sheet being work-hardened to 500 Hv or more by shearing, wherein
the fitting part is an insert structure configured to be inserted into a cutout of the shearing blade.

2. The shearing die according to claim 1, wherein
the fitting part satisfies at least one condition selected from (a) the fitting part is made of die steel having hardness higher than that of the shearing blade excluding the fitting part; (b) the fitting part is subjected to a surface nitriding treatment; and (c) the fitting part is subjected to a coating treatment.

3. The shearing die according to claim 2, wherein
the fitting part has a length of not less than 1 mm on both sides with a center at the position where the shearing blade comes in contact with the end of the first sheared edge.

4. The shearing die according to claim 1, wherein
the fitting part has a length of not less than 1 mm on both sides with a center at the position where the shearing blade comes in contact with the end of the first sheared edge.

5. A method for the press-forming of the metal sheet comprising the plurality of shearing processes, wherein
the method comprises a first shearing for shearing the formed article so as to leave an excess portion in a part of an outline of the formed article and a second shearing for shearing the excess portion in the direction intersecting the first-sheared edge formed in the first shearing to form into a formed shape, wherein
the excess portion is sheared using the shearing die according to claim 1 in the second shearing so as for the fitting part to come in contact with the end part of the sheared edge formed in the first shearing.

6. The method for the press-forming of the metal sheet according to claim 5, wherein
the metal sheet has a tensile strength of more than 980 MPa.

7. The method for the press-forming of the metal sheet according to claim 5, wherein
the fitting part satisfies at least one condition selected from (a) the fitting part is made of die steel having hardness higher than that of the shearing blade excluding the fitting part; (b) the fitting part is subjected to a surface nitriding treatment; and (c) the fitting part is subjected to a coating treatment, is used in the second shearing.

8. The method for the press-forming of the metal sheet according to claim 7, wherein
the metal sheet has a tensile strength of more than 980 MPa.

9. The method for the press-forming of the metal sheet according to claim 5, wherein
the fitting part has a length of not less than 1 mm on both sides with a center at the position where the shearing blade comes in contact with the end of the first sheared edge, is used in the second shearing.

10. The method for the press-forming of the metal sheet according to claim 9, wherein
the metal sheet has a tensile strength of more than 980 MPa.

11. The shearing die according to claim 1, further comprising
a plurality of the fitting parts configured to be inserted into a plurality of the cutouts in the shearing blade.

* * * * *